US012676865B2

(12) United States Patent
Bradley et al.

(10) Patent No.: US 12,676,865 B2
(45) Date of Patent: Jul. 7, 2026

(54) PLATFORM ACCESS REQUEST MANAGEMENT

(71) Applicant: OKTA, INC., San Francisco, CA (US)

(72) Inventors: Ryan Killoran Bradley, Brooklyn, NY (US); Ishan Ajit Korde, Seattle, WA (US); Macy Michael Abbey, Portola Valley, CA (US); Anthony Wade Hatfield, Brooklyn, NY (US); Mihir Bhende, San Diego, CA (US); William Stone Potter, Somerville, MA (US)

(*) Notice: Subject to any disclaimer, the term of this patent is extended or adjusted under 35 U.S.C. 154(b) by 132 days.

(21) Appl. No.: 18/648,198

(22) Filed: Apr. 26, 2024

(65) Prior Publication Data

US 2025/0337750 A1     Oct. 30, 2025

(51) Int. Cl.
*H04L 9/40* (2022.01)

(52) U.S. Cl.
CPC ........ *H04L 63/108* (2013.01); *H04L 63/0815* (2013.01); *H04L 63/104* (2013.01); *H04L 63/20* (2013.01); *H04L 2463/082* (2013.01)

(58) Field of Classification Search
CPC . H04L 63/108; H04L 63/0815; H04L 63/104; H04L 63/20; H04L 2463/082
See application file for complete search history.

(56) References Cited

U.S. PATENT DOCUMENTS

| 11,652,823 B1 * | 5/2023 | Gurínavíciute et al. ..................... H04L 63/108 726/27 |
| 2024/0179141 A1 * | 5/2024 | Dayan ................... H04L 63/083 |
| 2024/0223618 A1 * | 7/2024 | Kjelstrup .............. H04L 63/105 |

* cited by examiner

*Primary Examiner* — Baotran N To
(74) *Attorney, Agent, or Firm* — Holland & Hart LLP

(57) ABSTRACT

An administrator of an organization may create access policies within an access request management system which define relationships between resources and request-and-approval flows. For example, the administrator may create an access policy, and the access policy may be applied across multiple resources of the organization. The access policy may indicate rules that indicate characteristics of a request-and-approval flow for granting access to the corresponding resources. For example, the rules may indicate a duration to grant access to the users, a group of users that are eligible to request the resource, approving users that provide approval to the requesting user, and information to collect from the requesting users, among other examples.

19 Claims, 8 Drawing Sheets

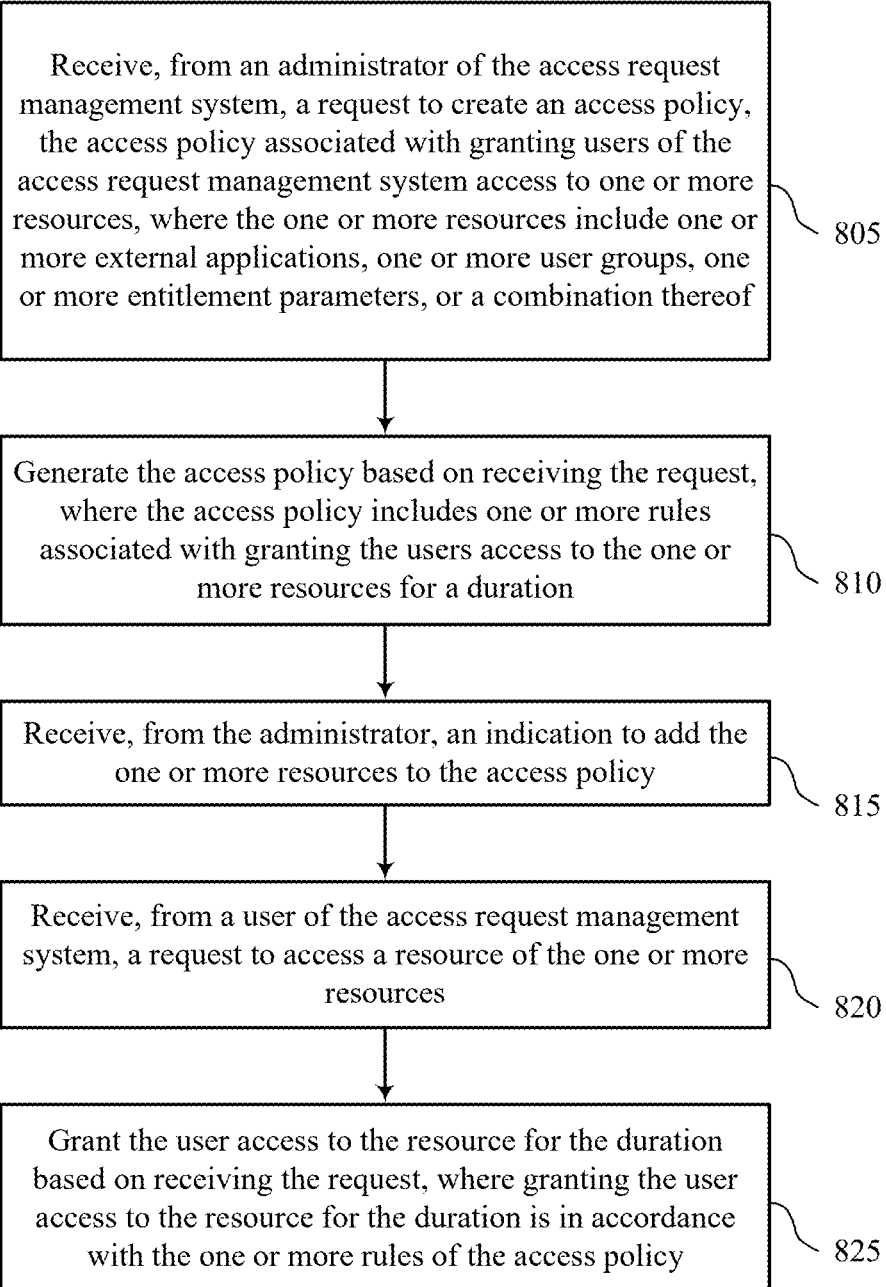

Receive, from an administrator of the access request management system, a request to create an access policy, the access policy associated with granting users of the access request management system access to one or more resources, where the one or more resources include one or more external applications, one or more user groups, one or more entitlement parameters, or a combination thereof

805

Generate the access policy based on receiving the request, where the access policy includes one or more rules associated with granting the users access to the one or more resources for a duration

810

Receive, from the administrator, an indication to add the one or more resources to the access policy

815

Receive, from a user of the access request management system, a request to access a resource of the one or more resources

820

Grant the user access to the resource for the duration based on receiving the request, where granting the user access to the resource for the duration is in accordance with the one or more rules of the access policy

PLATFORM ACCESS REQUEST MANAGEMENT

FIELD OF TECHNOLOGY

The present disclosure relates generally to identity management, and more specifically to platform access request management.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

In some cases, organizations may use tools, such as identity governance and administration (IGA) tools, to help manage identity and access privileges for users. However, for some use cases, conventional IGA tools may be relatively inefficient or time consuming.

SUMMARY

A method for managing access requests to an access request management system by an apparatus is described. The method may include receiving, from an administrator of the access request management system, a request to create an access policy, the access policy associated with granting users of the access request management system access to one or more resources, where the one or more resources include one or more applications, one or more user groups, one or more entitlement parameters, or a combination thereof, generating the access policy based on receiving the request, where the access policy includes one or more rules associated with granting the users access to the one or more resources for a duration, receiving, from the administrator, an indication to add the one or more resources to the access policy, receiving, from a user of the access request management system, a request to access a resource of the one or more resources, and granting the user access to the resource for the duration based on receiving the request, where granting the user access to the resource for the duration is in accordance with the one or more rules of the access policy.

An apparatus for managing access requests to an access request management system is described. The apparatus may include one or more memories storing processor executable code, and one or more processors coupled with the one or more memories. The one or more processors may individually or collectively be operable to execute the code to cause the apparatus to receive, from an administrator of the access request management system, a request to create an access policy, the access policy associated with granting users of the access request management system access to one or more resources, where the one or more resources include one or more applications, one or more user groups, one or more entitlement parameters, or a combination thereof, generate the access policy based on receiving the request, where the access policy includes one or more rules associated with granting the users access to the one or more resources for a duration, receive, from the administrator, an indication to add the one or more resources to the access policy, receive, from a user of the access request management system, a request to access a resource of the one or more resources, and grant the user access to the resource for the duration based on receiving the request, where granting the user access to the resource for the duration is in accordance with the one or more rules of the access policy.

Another apparatus for managing access requests to an access request management system is described. The apparatus may include means for receiving, from an administrator of the access request management system, a request to create an access policy, the access policy associated with granting users of the access request management system access to one or more resources, where the one or more resources include one or more applications, one or more user groups, one or more entitlement parameters, or a combination thereof, means for generating the access policy based on receiving the request, where the access policy includes one or more rules associated with granting the users access to the one or more resources for a duration, means for receiving, from the administrator, an indication to add the one or more resources to the access policy, means for receiving, from a user of the access request management system, a request to access a resource of the one or more resources, and means for granting the user access to the resource for the duration based on receiving the request, where granting the user access to the resource for the duration is in accordance with the one or more rules of the access policy.

A non-transitory computer-readable medium storing code for managing access requests to an access request management system is described. The code may include instructions executable by one or more processors to receive, from an administrator of the access request management system, a request to create an access policy, the access policy associated with granting users of the access request management system access to one or more resources, where the one or more resources include one or more applications, one or more user groups, one or more entitlement parameters, or a combination thereof, generate the access policy based on receiving the request, where the access policy includes one or more rules associated with granting the users access to the one or more resources for a duration, receive, from the administrator, an indication to add the one or more resources to the access policy, receive, from a user of the access request management system, a request to access a resource of the one or more resources, and grant the user access to the resource for the duration based on receiving the request, where granting the user access to the resource for the duration is in accordance with the one or more rules of the access policy.

Some examples of the method, apparatus, and non-transitory computer-readable medium described herein may further include operations, features, means, or instructions for displaying, based on receiving the request from the user to access the resource, a user interface associated with the access policy based on an identity of the user, the one or more rules of the access policy, or both.

Some examples of the method, apparatus, and non-transitory computer-readable medium described herein may further include operations, features, means, or instructions for receiving, based on displaying the user interface, one or more inputs from the user, where granting the user access to the resource may be based on the one or more inputs.

Some examples of the method, apparatus, and non-transitory computer-readable medium described herein may further include operations, features, means, or instructions for displaying, to one or more users including the user, a user interface corresponding to a resource catalog, the resource catalog including a respective indicator for each of the one or more resources, where the respective indicator includes a name associated with the resource, an icon associated with the resource, a description associated with the resource, or a combination thereof.

In some examples of the method, apparatus, and non-transitory computer-readable medium described herein, the one or more rules of the access policy indicate a group of users capable of requesting access to the one or more resources and displaying the user interface corresponding to the resource catalog may be based on the indicated group of users.

Some examples of the method, apparatus, and non-transitory computer-readable medium described herein may further include operations, features, means, or instructions for receiving, from the user based on displaying the user interface corresponding to the resource catalog, one or more inputs to the user interface, where receiving the request to access the resource may be based on receiving the one or more inputs.

Some examples of the method, apparatus, and non-transitory computer-readable medium described herein may further include operations, features, means, or instructions for receiving, from the administrator, an indication to modify the name associated with the resource, the icon associated with the resource, the description associated with the resource, or a combination thereof.

Some examples of the method, apparatus, and non-transitory computer-readable medium described herein may further include operations, features, means, or instructions for transmitting, to a resource provider associated with the resource based on granting the user access to the resource, an indication that the user may be granted access to the resource.

Some examples of the method, apparatus, and non-transitory computer-readable medium described herein may further include operations, features, means, or instructions for determining to grant the user access to the resource for the duration based on the one or more rules of the access policy and transmitting, to the resource provider, an indication of the duration associated with granting the user access to the resource.

Some examples of the method, apparatus, and non-transitory computer-readable medium described herein may further include operations, features, means, or instructions for receiving, from the user, a second request to access a set of multiple resources associated with the access policy and granting the user access to each resource of the set of multiple resources in accordance with the one or more rules of the access policy.

Some examples of the method, apparatus, and non-transitory computer-readable medium described herein may further include operations, features, means, or instructions for receiving, from the user, a second request to grant a second user of the access request management system access to the resource, where the second user may be different from the user and granting the second user access to the resource for the duration based on receiving the second request, where granting the second user access to the resource for the duration may be in accordance with the one or more rules of the access policy.

BRIEF DESCRIPTION OF THE DRAWINGS

FIG. 8 shows a flowchart illustrating methods that support platform access request management in accordance with aspects of the present disclosure.

DETAILED DESCRIPTION

Figure 1:
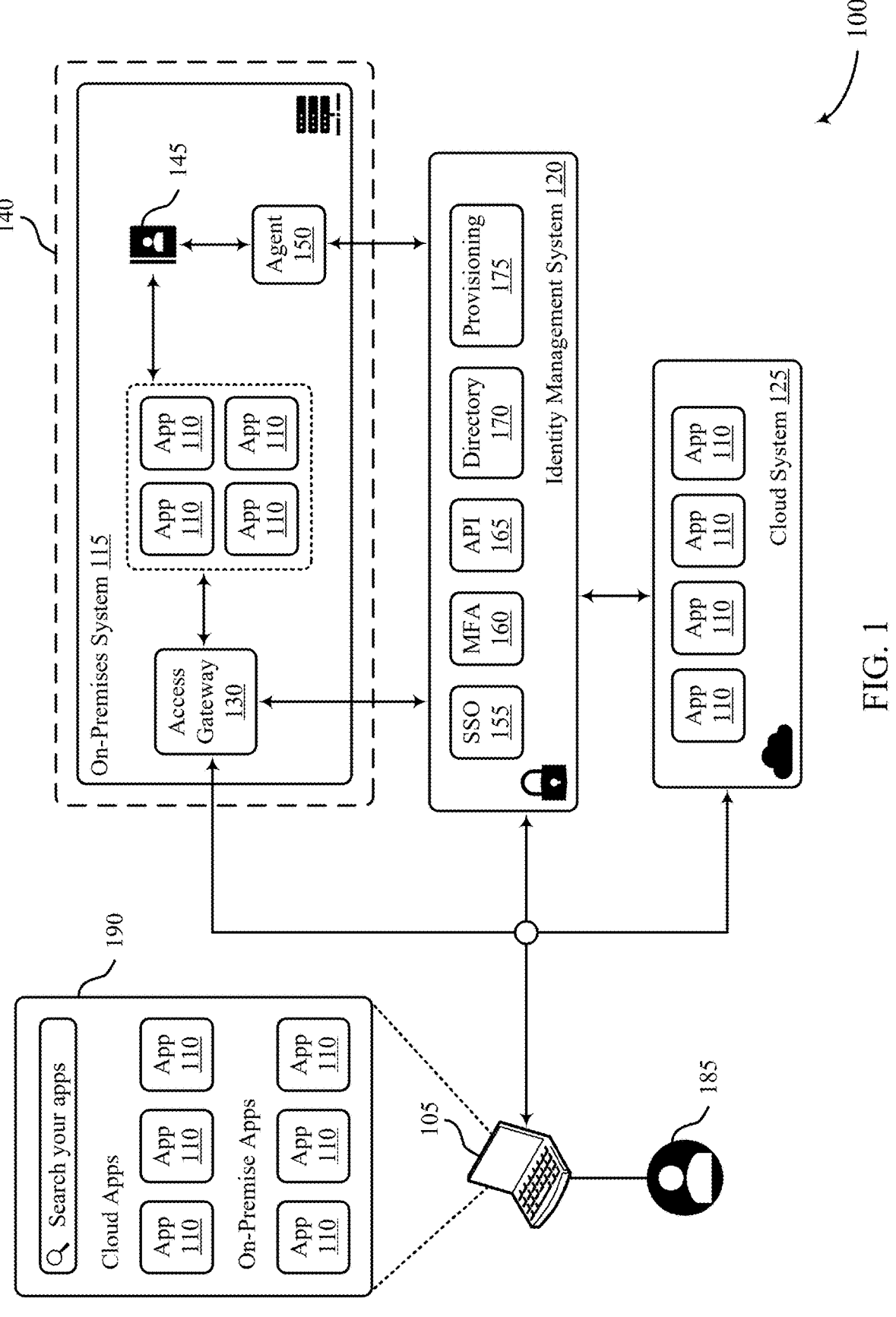
FIGS. 1 and 2 illustrate examples of a computing system that supports platform access request management in accordance with aspects of the present disclosure.

Some organizations may limit user access privileges to resources, such as software applications, groups, systems, servers, entitlements (e.g., entailment values, entitlement bundles), among other types of resources. The organizations may limit user access privileges to resources by implementing request-and-approval flows. For example, users of the organization may submit a request for access to a resource, and the organization (e.g., an approving entity or user) may review the access request before granting (or denying) the user access to the resource. Request-and-approval flows may support increased security, increased compliance, or efficient license management, among other benefits. For example, the organization may implement request-and-approval flows for a software application to avoid unsuitable access to the resource. Additionally, or alternatively, the organization may implement request-and-approval flows to avoid an accumulation of access (e.g., elevated access or privileged access) to the resource unnecessarily. In some examples, by using the request-and-approval flows for granting access to resources, the organization may limit an amount of access a user is granted to a level that is appropriate to the user, thereby increasing security and reducing costs associated with licensing software applications.

In some examples, an organization (e.g., a manager of the organization, an owner of the organization, an administrator of the organization) may manually create roles (e.g., access packages) using an identity governance and administration (IGA) tool, to help manage identity and access privileges for users of the organization. The created roles may be requestable by users of the organization and may grant users access to one or more resources. In some examples, each of the roles may follow a request-and-approval flow. In some cases, however, an organization may include multiple resources, and the necessity of creating roles for each resource to make that resource requestable may impose a considerable burden on the organization. For example, some resources may follow a same, or similar, request-and-approval flow, and the organization may create duplicate roles for each of the requestable resources. Additionally, or alternatively, a role may lose an association with the corresponding resource that the role grants access to, which may cause difficulty for a user in determining which roles are relevant to the user and which resources the user has already received access to.

In accordance with aspects described herein, an administrator of an organization may create access policies within an access request management system which define relationships between resources and request-and-approval flows. For example, the administrator may create an access policy, and the access policy may be applied (e.g., reused) across multiple resources of the organization. The access policy may indicate one or more rules that indicate characteristics of a request-and-approval flow for granting access to the corresponding resources. For example, the rules may indicate a duration to grant access to the users, a group of users that are eligible to request the resource, one or more approving users that provide approval to the requesting user, and information to collect from the requesting user, among other examples. The creation of access policies by the administrator may support increased efficiency of access request management for multiple resources of the organization and may leverage reuse to eliminate unnecessary duplication of access roles.

In some cases, the access request management system may display a user interface to end-users that includes a resource catalog of requestable resources. The resources displayed in the resource catalog may be indicated by a name, a logo, and a description, among other identifying information. In some examples, resources that are displayed in the resource catalog may be different for each user and may be based on an identity of the user. That is, the resource catalog may display resources that a user is capable of requesting, and other resources may be hidden from the user. In some examples, a user may simultaneously select multiple resources from the resource catalog to request access to the multiple resources. Additionally, or alternatively, a first user may request access on behalf of a second user, and the second user may be granted access to the resource based on the request from the first user.

By enabling the creation of access policies reused over multiple resources and displaying requestable resources in a resource catalog, the described techniques may lead to increased security and improved user experience related to reduced processing, reduced overhead, and increased system organization. For example, the creation of access policies may enable administrators to manage access requests more efficiently from users, which may result in more efficient on-boarding of new users to an organization, resulting in an improved user experience. In some examples, the creation of access policies in accordance with aspects described herein may enable an administrator to create one access policy and reuse the access policy for multiple resources, which may support increased scalability and reuse. In some examples, the creation of access policies may support a capability of access requests to utilize metadata associated with resources, which may reduce overhead, increase system organization, and improve user experience and understandability. In some examples, utilization of a resource catalog to limit a quantity of resources that are visible to a user and requestable by the user may result in increased system security. In some examples, creation of access policies in accordance with aspects described herein may limit which users can request a resource and may limit for how long the users gain access to the resource (e.g., time-bound access requests), which may support increased security and increased compliance.

Aspects of the disclosure are initially described in the context of computing systems. Aspects of the disclosure are further described in the context of interfaces, architectures, and process flows. Aspects of the disclosure are further illustrated by and described with reference to apparatus diagrams, system diagrams, and flowcharts that relate to platform access request management.

FIG. 1 illustrates an example of a computing system 100 that supports platform access request management in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning (ML), artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

The identity management system 120 may support platform access request management to collect and perform action related to access requests received from a user 185 via a computing device 105. For example, the identity management system 120 may implement one or more access policies which define rules for request-and-approval flows between the user 185 and the identity management system 120 to grant the user 185 access to resources (e.g., applications 110, groups, servers). The administrator may add multiple resources to the access policy, such that granting a user 185 access to the added resources is in accordance with rules of the access policy. In some examples, the access policies may be associated with applications 110 of on-premises system 115, applications 110 of the cloud system 125, or both. In some examples, the identity management system may display, to the computing device 105 via the interface 190, a resource catalog that includes resources that the user 185 may request access to. In some examples, the identity management system may grant access to one or more resources based on inputs from the user 185 via the interface 190.

Figure 2:
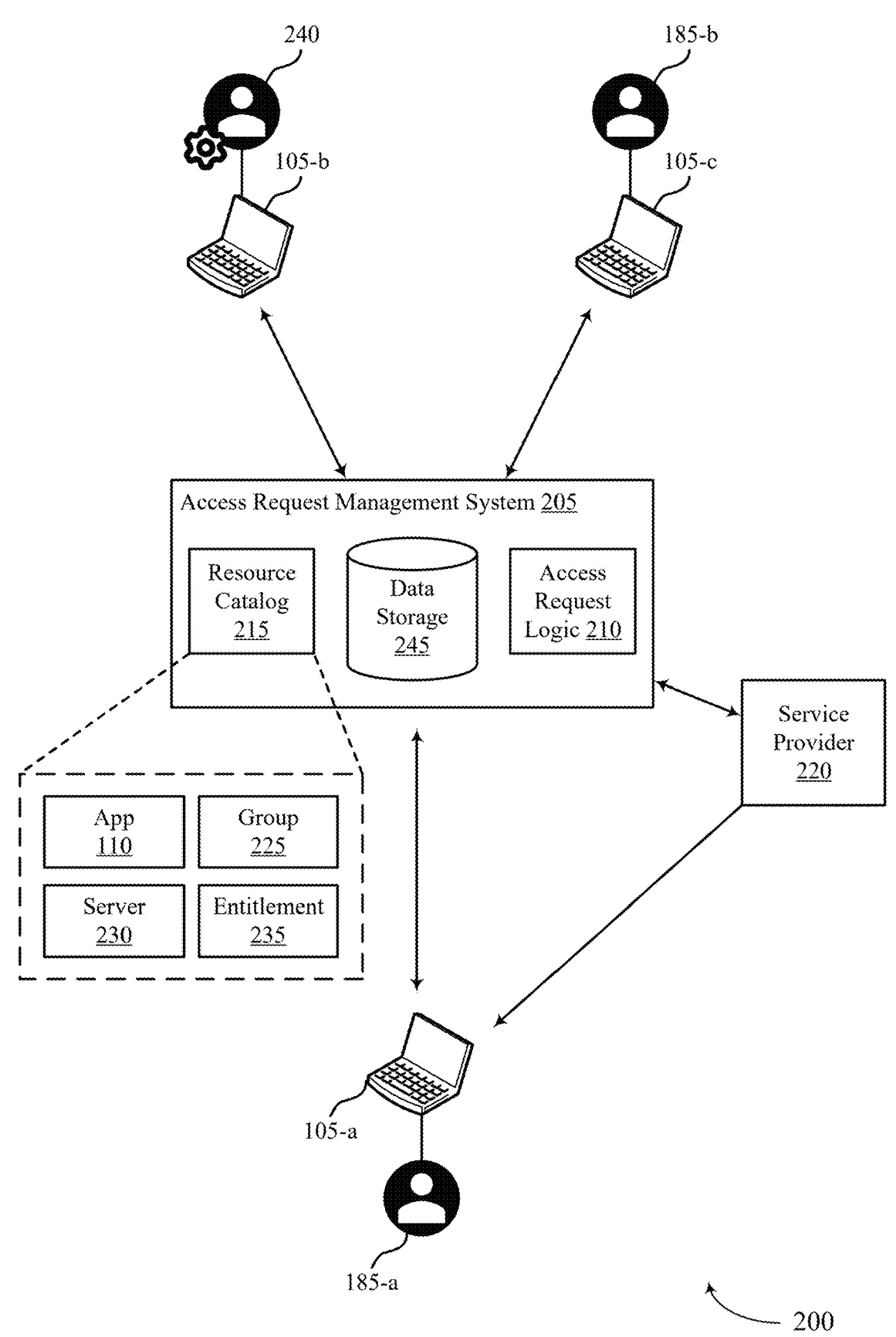

FIG. 2 shows an example of a computing system 200 that supports platform access request management in accordance with aspects of the present disclosure. The computing system 200 may be implemented by or may implement aspects of the computing system 100. For example, the computing system 200 may include a user 185-*a* of a client device 105-*a* and a user 185-*b* of a client device 105-*c*, which may be examples of devices and entities described with reference to FIG. 1. The computing system 200 may include an administrator 240 of a client device 105-*b*, and the administrator 240 may be an example of a user 185, as described with reference to FIG. 1. The computing system 200 may include an access request management system 205, which may be, or may be implemented by, an identity management system 120, as described with reference to FIG. 1.

The access request management system 205 may implement various procedures to support access requests from the user 185-*a*. For example, to grant the user 185-*a* access to a resource based on a request from the user 185-*a*, the access request management system 205 may perform or enable the following steps: discovery, collection, approval, and fulfillment. In some examples, the access request management system 205 may include access request logic 210 which may indicate one or more rules for granting a user 185-*a* access to one or more resources.

The administrator 240 may create access policies to be included in the access request logic 210. For example, the access request management system 205 may receive, from the administrator 240, a request to create an access policy. The access policy may indicate conditions for granting users 185 (e.g., a user 185-*a*) access to one or more resources. The access request management system 205 may generate the access policy based on receiving the request, and the access policy may include rules (e.g., conditions) associated with granting the users 185 access to the one or more resources for a duration. Each of the access policies may apply to multiple resources. For example, the access request management system 205 may receive, from the administrator 240, an indication to add the one or more resources to the access policy. In some cases, the access request logic 210 may indicate rules (e.g., configurations, conditions) for the collection and approval steps of an access request procedure. For example, the access request logic 210 may indicate a group of users 185 (e.g., user 185-*a*) that is capable of requesting access to a resource, a group of users 185 (e.g., user 185-*b*) that is capable of approving access requests for the group of users, information to collect from the user 185-*a* during the collection step of the access request, or a combination thereof.

During the discovery step, the user 185-*a* may conduct a search, via the client device 105-*a*, for a resource that the user 185-*a* is attempting to gain access to. The resource may be an application 110 (e.g., an on-premises application 110, a cloud application 110, an external application 110), a group 225 (e.g., a group 225 of users 185), a server 230, or an entitlement parameter 235 (e.g., entitlement values, entitlement bundles). A group 225 or an entitlement parameter 235 may have an association with another resource (e.g., with an application 110), or may be a sub-resource of another resource (e.g., as described with reference to FIG. 3). In some examples, the access request management system 205 may implement, or generate, a resource catalog 215. The resource catalog 215 may be displayed to the user 185-*a* via a user interface at the client device 105-*a*. In some examples, the user 185-*a* may select resources from the resource catalog 215, which may trigger access requests for each of the resources selected. For example, the access request management system 205 may receive, from the user 185-*a*, a request to access a resource (e.g., a resource of the resource catalog 215, a resource associated with an access policy). Additionally, or alternatively, the user 185-*a* may attempt to access a resource and may be denied access. Based on being denied access, the access request management system 205 may prompt the user 185-*a* to submit a request (e.g., without an action by the user 185-*a* to navigate to the resource catalog 215).

The resource catalog 215 may include resources associated with an organization of the user 185-*a* which may be requestable by the user 185-*a*. The user 185-*a* may initiate a request for access to a resource via one or more inputs to the resource catalog 215. In some examples, the resource catalog 215 may indicate a set of resources that the user 185-*a* has access to (e.g., has already obtained access to). In some examples, the resource catalog 215 may display (e.g., may aggregate) resources from multiple sources (e.g., an identity management system 120, a privileged access management (PAM) system, an IGA system, etc.). In some examples, a subset of resources may be hidden from the user 185-*a* (e.g., may not be displayed at the resource catalog 215) based on a risk level (e.g., a perceived risk level) associated with the user 185-*a* of the client device 105-*a*, based on the access request logic 210, or both. In some examples, the user 185-*a* may be granted access to a resource for a duration (e.g., which may be indicated by the access request logic 210), and the user 185-*a* may submit, via the user interface associated with the resource catalog 215, a request to extend access to the resource (e.g., for an extended duration). In some examples, the user 185-*a* may monitor an access request (e.g., monitor a progress of the access request) that the user 185-*a* previously submitted.

During the collection step, the access request management system 205 may gather information (e.g., inputs) from the user 185-*a*. The access request management system 205 may query the user 185-*a* with one or more queries to collect the information, and the one or more queries may be based on the access request logic 210. For example, based on the user 185-*a* initiating the access request (e.g., during the discovery step, via the resource catalog 215), the access request management system 205 may initiate and/or display a user flow (e.g., a user interface, a questionnaire, a form) that queries the user 185-*a* with questions. In some examples, the user flow may be dynamic based on an identity of the requesting user 185-*a*, an access policy that is configured for the requested resource, or both. For example, the user flow may be configurable by the administrator 240 and may be different from resource to resource based on the access request logic 210 (e.g., access policy) for that resource. The user queries may pertain to an identity of the user, a reason for requesting access (e.g., a business justification), or any other question. The access request management system 205 may collect and store the access request submitted by the user 185-*a*, an identity of the user 185-*a*, responses by the user 185-*a* to queries, or a combination thereof to data storage 245.

During the approval step, the access request management system 205 may forward an indication of the access request to another user 185-*b* (e.g., an approving user 185-*b*) of a client device 105-*c*. For example, the access request management system 205 may output, to the user 185-*b* based on the access request logic 210 (e.g., based on rules of an access policy), an indication of the request from the user 185-*a*. The indication may include an identifier of the user 185-*a* and an identifier of the resource associated with the request. In some examples, the access request management system 205 may transmit the indication of the request to multiple approving users 185 (e.g., including the user 185-*b*). In some examples, the indication of the access request may be transmitted to the user 185-*b* via a messaging platform (e.g., e-mail, a chat application, etc.). The indication of the access request may indicate a resource being requested, an identity of the user 185-*a* requesting the resource (e.g., profile data), other resources that the user 185-*a* has gained access to, a perceived risk of the user 185-*a*, a recommended decision regarding the access request, or a combination thereof. The access request management system 205 may receive an approval indication (e.g., approval, rejection) from the user 185-*b* that indicates whether the user 185-*a* is granted access to the resource (e.g., indicating to approve the request from the user 185-*a*).

The access request management system 205 may determine to grant the user 185-*a* access to the resource for a duration (e.g., based on receiving the access request from the user 185-*a*, based on receiving the approval indication from the approving user 185-*b*, or both). Granting the user 185-*a* access to the resource may be in accordance with the access request logic 210 (e.g., rules of an access policy).

During the fulfillment step, the access request management system 205 may transmit, to a service provider 220 associated with the resource, an indication that the user 185-*a* is granted access to the resource. The access request management system 205 may indicate one or more conditions for fulfilling the access to the resource (e.g., a duration that the user 185-*a* is granted access to the resource). The service provider 220 may be responsible for fulfilling access to the resource for the user 185-*b*. The service provider 220 may be an owner of the resource, a manager of the resource, or a server associated with the resource. In some examples, the service provider 220 may be the administrator 240.

Figure 3:
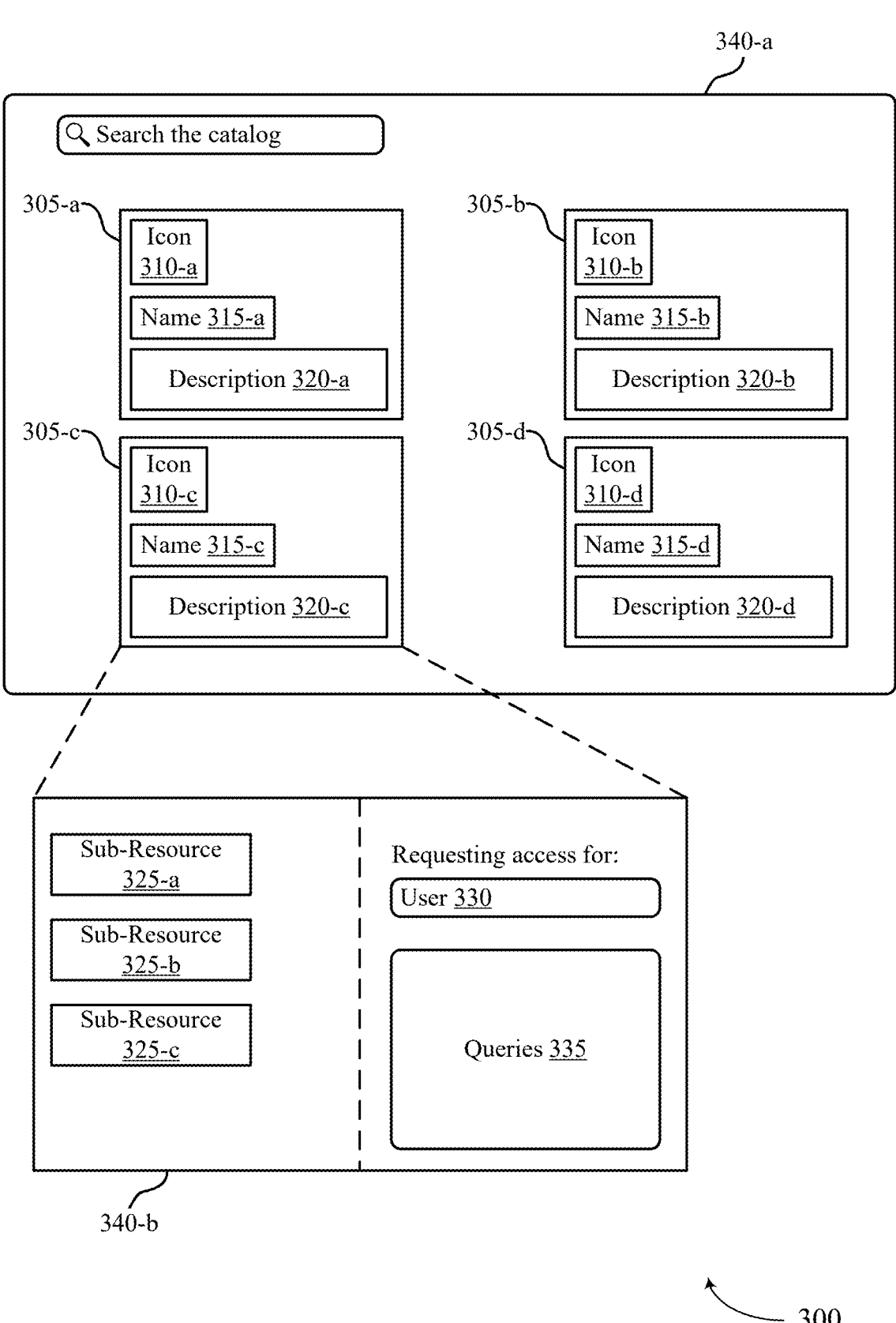
FIG. 3 shows an example of an interface that supports platform access request management in accordance with aspects of the present disclosure.

FIG. 3 shows an example of an interface 300 that supports platform access request management in accordance with aspects of the present disclosure. The interface 300 may be implemented by or may implement aspects of the computing system 100 and the computing system 200. For example, the interface 300 may be an interface between the client device 105-*a* and the access request management system 205, as described with reference to FIG. 2. For example, the interface 300 may be displayed at the client device 105-*a* and to the user 185-*a*. The interface 300 may include a user interface 340-*a* and a user interface 340-*b*, which may implement a resource catalog 215, as described with reference to FIG. 2.

A user of an access request management system may navigate to a user interface 340-*a*, and the user interface 340-*a* may display a catalog of resources. The catalog of resources may include a resource 305-*a*, a resource 305-*b*, a resource 305-*c*, and a resource 305-*d*. Each resource 305 in the user interface 340-*a* may be indicated by one or more respective indicators. For example, each resource may be indicated by a respective icon 310, a respective name 315, and a respective description 320. For example, the resource 305-*a* may be indicated by the icon 310-*a*, the name 315-*a*, and the description 320-*a*; the resource 305-*b* may be indicated by the icon 310-*b*, the name 315-*b*, and the description 320-*b*; the resource 305-*c* may be indicated by the icon 310-*c*, the name 315-*c*, and the description 320-*c*; and the resource 305-*d* may be indicated by the icon 310-*d*, the name 315-*d*, and the description 320-*d*. In some cases, the user may search the catalog for a resource (e.g., by name). In some examples, the access request management system may receive an indication from an administrator (e.g., an administrator 240) to modify (e.g., customize, configure) the icon 310, the name 315, the description 320, or a combination thereof of a resource 305.

The user may initiate access requests to resources of the resource catalog via one or more inputs to the user interface 340-*a*. The access request management may display a user interface 340-*b* based on the user selecting the resource 305-*c*. The user interface 340-*b* may indicate sub-resources 325 (e.g., a sub-resource 325-*a*, a sub-resource 325-*b*, a sub-resource 325-*c*) of the resource 305-*c*. For example, the sub-resources 325 may correspond to licenses, groups, entitlement parameters (e.g., bundles, values), certifications, roles, user groups, or other requestable resources associated with the resource 305-*c* (e.g., which may be a software application). In some cases, associations between the resources 305 and the sub-resources 325 may be preconfig-ured at the access request management system 205 (e.g., via an administrator) or may be based on associations config-ured at an identity management system (e.g., an identity management system 120). Each of the sub-resources 325 may be requestable by the user.

Based on the user selecting a resource 305 (e.g., the resource 305-*c*) from the user interface 340-*a*, or a sub-resource 325 (e.g., a sub-resource 325-*a*) from the user interface 340-*b*, the access request management system may display a user flow to the user. The user flow may query the user for an indication of an identity of a user 330 that the access request applies to (e.g., that the access request is for the user 330). In some examples, the user may indicate an identity of the user itself. In some other examples, the user may be submitting the access request on behalf of a second user, and the user may indicate that the user 330 is the second user. Additionally, or alternatively, the user interface 340-*b* may display queries 335 to collect information from the user, which may inform a decision by the access request management system whether to grant access to the resource, as described in greater detail with reference to FIG. 2. In some examples, the user interface 340-*b*, or the queries 335, or both, may be based on an identity of the requesting user or an access policy associated with the resource 305-*c*, or both.

Figure 4:
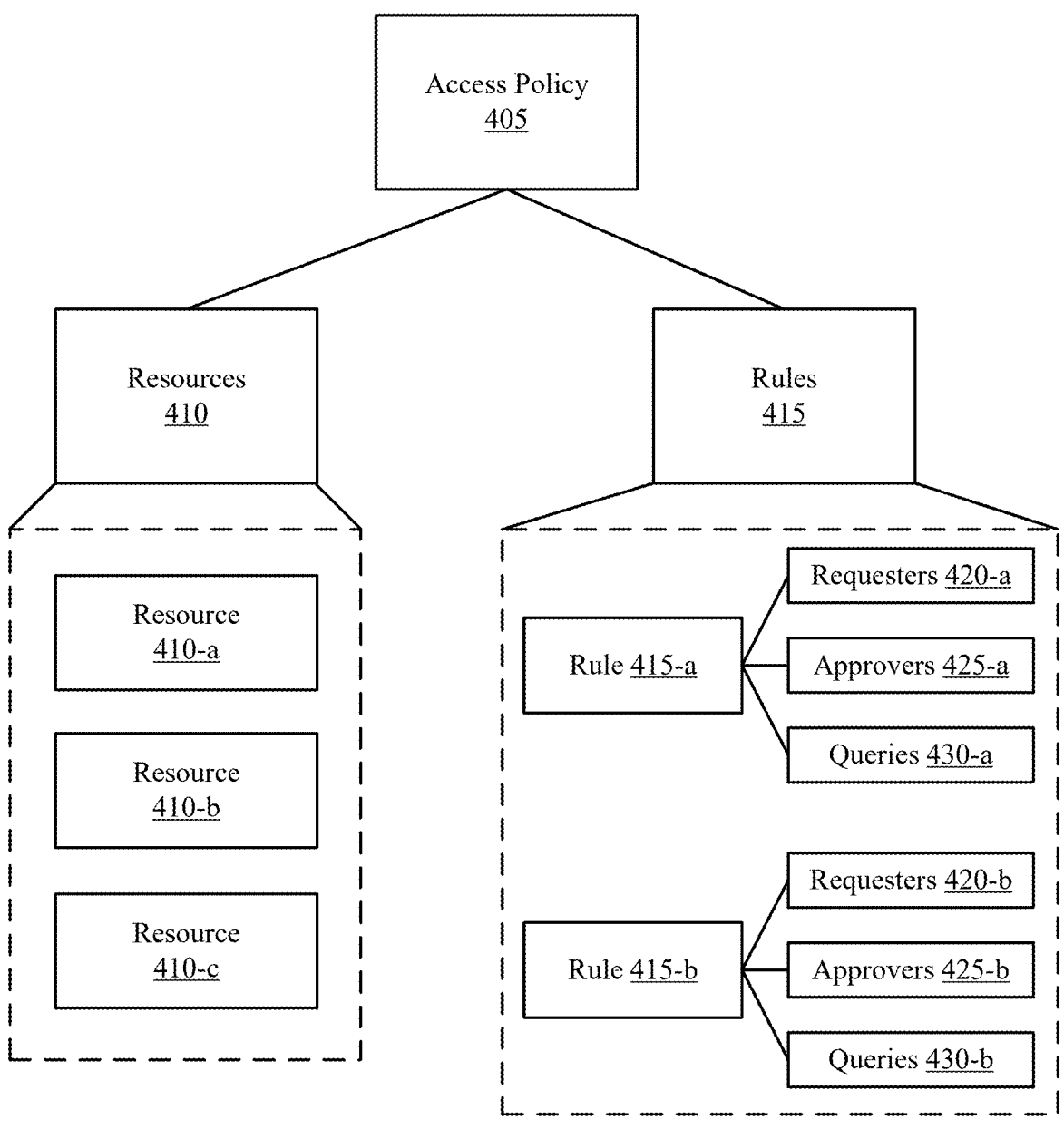
FIG. 4 shows an example of an architecture that supports platform access request management in accordance with aspects of the present disclosure.

FIG. 4 shows an example of an architecture 400 that supports platform access request management in accordance with aspects of the present disclosure. The architecture 400 may implement or may be implemented by aspects of the computing system 100 and the computing system 200. For example, the architecture 400 may include an access policy 405, which may be a portion of or may be implemented by access request logic 210, as described with reference to FIG. 2.

An administrator (e.g., of an organization, of an access request management system) may create an access policy 405 within the access request management system. The access policy 405 may include rules 415, which may indi-cate one or more conditions for collection and/or approval of access requests from a user. For example, the rules 415 may include a group of requesting users 420 capable of request-ing the resource, a group of approving users 425 capable of providing approval for the access request, a set of queries 430 that indicate information (e.g., inputs to questions) to collect from the requesting users 420, or a combination thereof. In some examples, the rules 415 may indicate a duration (e.g., a time duration) for granting the requesting user access to the resource.

In an illustrative example, the rule 415-*a* may indicate that the group of requesting users 420-*a* that is capable of requesting the resources 410 is anyone in the organization. The rule 415-*a* may indicate, via an indication of the group of approving users 425-*a*, that a manager of the requesting user is capable of approving the access request. The rule 415-*a* may indicate that the user is to provide a response to queries 430-*a* that indicates a business justification (e.g., "Why do you need this resource?") associated with the access request. In an illustrative example, the rule 415-*b* may indicate that the group of requesting users 420-*a* that is capable of requesting the resources 410 is members of a practice group of the organization (e.g., engineers). The rule 415-*b* may indicate, via an indication of the approving users 425-*b*, that the access request management system grants the requesting users 420-*a* associated with the rule 415-*b* access to the resources 410 without any approval (e.g., an auto-approval). The rule 415-*b* may indicate that the user is to provide a response to queries 430-*a* that indicate a duration that the user is requesting access to the resource (e.g., How long do you need access to this resource?").

In some examples, the administrator may indicate to the access management system to add resources 410 to the access policy 405. For example, the administrator may create a link between the access policy and the resource 410-*a*, the resource 410-*b*, and the resource 410-*c*. By creating the link between the access policy and the resources 410, granting access to each of the resources 410 may follow the same access request logic (e.g., user flows, approvers, etc.). For example, the access management system may configure access requests for the resources 410 in accor-dance with the rules 415 of the access policy. That is, a user may request access to any one of the resources 410, and the user may be granted access to the resource 410 based on the rules 415. For example, if the user is included in the group of requesting users 420-*a*, an access request from the user for the resource 410-*a* may be forwarded to an approver of the group of approving users 425-*a* associated with the rule 415-*a*, the user may be requested to provide one or more inputs to queries 430-*a* associated with the rule 415-*a*, or both. In some examples, the administrator may remove a subset of resources (e.g., a resource 410-*c*) from the access policy 405, may remove a subset of rules (e.g., a rule 415-*b*), or a combination thereof.

In some examples, the administrator may add multiple rules 415 (e.g., a rule 415-*a*, a rule 415-*b*) to the access policy 405. The rule 415-*a* may indicate a group of request-ing users 420-*a*, a group of approving users 425-*a*, and a set of queries 430-*a*. The rule 415-*b* may indicate a group of requesting users 420-*b*, a group of approving users 425-*b*, and a set of queries 430-*b*. The rule 415-*a* may be for a first type of requesting user 420-*a* and the rule 415-*b* may be for a second type of requesting user 420-*b*. In some examples, the rules 415 may be assigned different priorities. In cases where the user is eligible for multiple rules 415 (e.g., is part of the group of requesting users 420-*a* and the group of requesting users 420-*b*), granting access to the user may be in accordance with the rule with a higher priority.

Figure 5:
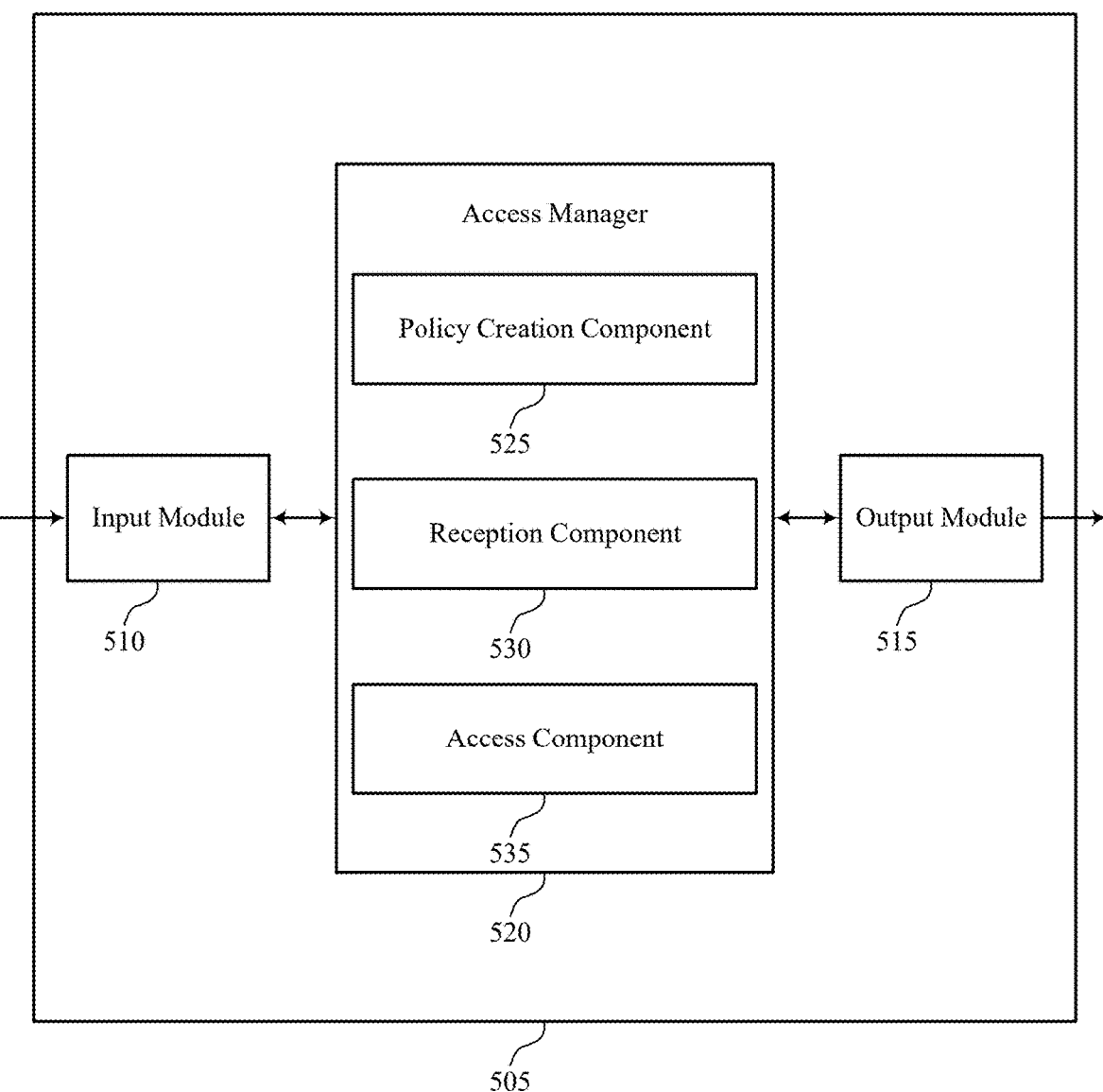
FIG. 5 shows a block diagram of an apparatus that supports platform access request management in accordance with aspects of the present disclosure.

FIG. 5 shows a block diagram 500 of a device 505 that supports platform access request management in accordance with aspects of the present disclosure. The device 505 may include an input module 510, an output module 515, and an access manager 520. The device 505, or one or more components of the device 505 (e.g., the input module 510, the output module 515, the access manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the access manager 520 to support platform access request management. In some cases, the input module 510 may be a component of an input/output (I/O) controller 710 as described with reference to FIG. 7.

The output module 515 may manage output signals for the device 505. For example, the output module 515 may receive signals from other components of the device 505, such as the access manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the access manager 520 may include a policy creation component 525, a reception component 530, an access component 535, or any combination thereof. In some examples, the access manager 520, or various components thereof, may be configured to perform various operations (e.g., receiving, monitoring, transmitting) using or otherwise in cooperation with the input module 510, the output module 515, or both. For example, the access manager 520 may receive information from the input module 510, send information to the output module 515, or be integrated in combination with the input module 510, the output module 515, or both to receive information, transmit information, or perform various other operations as described herein.

The access manager 520 may support managing access requests to an access request management system in accordance with examples as disclosed herein. The policy creation component 525 may be configured to support receiving, from an administrator of the access request management system, a request to create an access policy, the access policy associated with granting users of the access request management system access to one or more resources, where the one or more resources include one or more applications, one or more user groups, one or more entitlement parameters, or a combination thereof. The policy creation component 525 may be configured to support generating the access policy based on receiving the request, where the access policy includes one or more rules associated with granting the users access to the one or more resources for a duration. The reception component 530 may be configured to support receiving, from the administrator, an indication to add the one or more resources to the access policy. The reception component 530 may be configured to support receiving, from a user of the access request management system, a request to access a resource of the one or more resources. The access component 535 may be configured to support granting the user access to the resource for the duration based on receiving the request, where granting the user access to the resource for the duration is in accordance with the one or more rules of the access policy.

Figure 6:
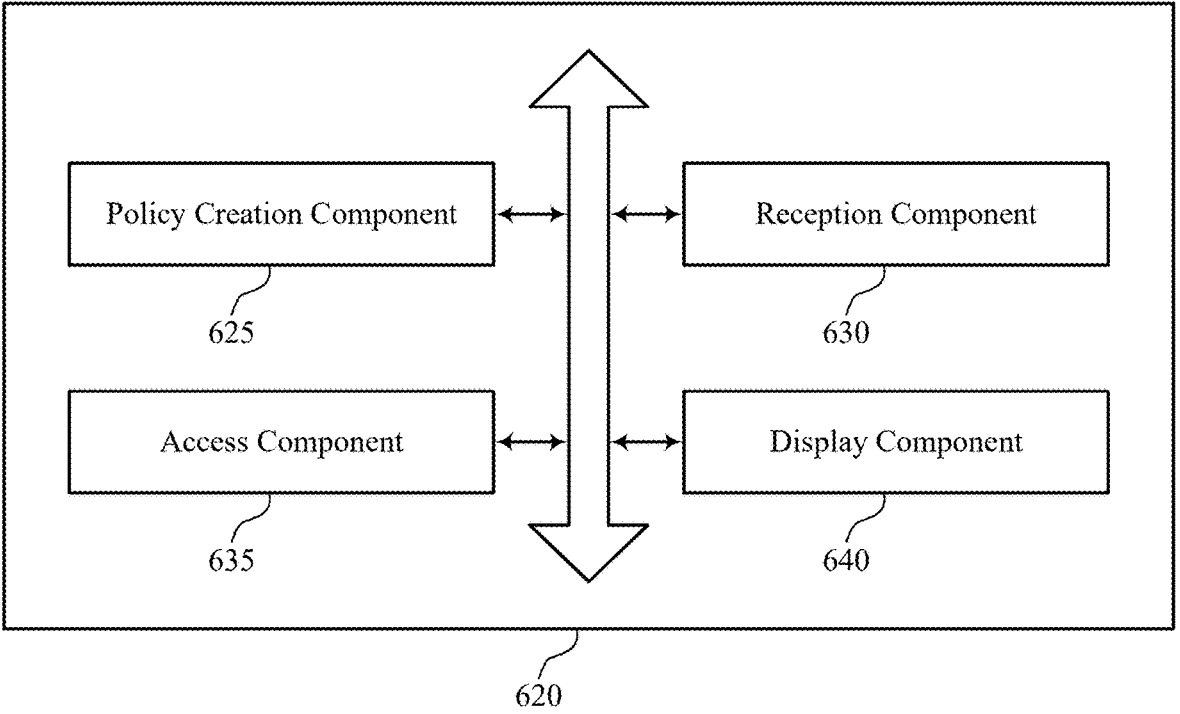
FIG. 6 shows a block diagram of an access manager that supports platform access request management in accordance with aspects of the present disclosure.

FIG. 6 shows a block diagram 600 of an access manager 620 that supports platform access request management in accordance with aspects of the present disclosure. The access manager 620 may be an example of aspects of an access manager or an access manager 520, or both, as described herein. The access manager 620, or various components thereof, may be an example of means for performing various aspects of platform access request management as described herein. For example, the access manager 620 may include a policy creation component 625, a reception component 630, an access component 635, a display component 640, or any combination thereof. Each of these components, or components of subcomponents thereof (e.g., one or more processors, one or more memories), may communicate, directly or indirectly, with one another (e.g., via one or more buses).

The access manager 620 may support managing access requests to an access request management system in accordance with examples as disclosed herein. The policy creation component 625 may be configured to support receiving, from an administrator of the access request management system, a request to create an access policy, the access policy associated with granting users of the access request management system access to one or more resources, where the one or more resources include one or more applications, one or more user groups, one or more entitlement parameters, or a combination thereof. In some examples, the policy creation component 625 may be configured to support generating the access policy based on receiving the request, where the access policy includes one or more rules associated with granting the users access to the one or more resources for a duration. The reception component 630 may be configured to support receiving, from the administrator, an indication to add the one or more resources to the access policy. In some examples, the reception component 630 may be configured to support receiving, from a user of the access request management system, a request to access a resource of the one or more resources. The access component 635 may be configured to support granting the user access to the resource for the duration based on receiving the request, where granting the user access to the resource for the duration is in accordance with the one or more rules of the access policy.

In some examples, the display component 640 may be configured to support displaying, based on receiving the request from the user to access the resource, a user interface associated with the access policy based on an identity of the user, the one or more rules of the access policy, or both.

In some examples, the reception component 630 may be configured to support receiving, based on displaying the user interface, one or more inputs from the user, where granting the user access to the resource is based on the one or more inputs.

In some examples, the display component 640 may be configured to support displaying, to one or more users including the user, a user interface corresponding to a resource catalog, the resource catalog including a respective indicator for each of the one or more resources, where the respective indicator includes a name associated with the resource, an icon associated with the resource, a description associated with the resource, or a combination thereof.

In some examples, the one or more rules of the access policy indicate a group of users capable of requesting access to the one or more resources. In some examples, displaying the user interface corresponding to the resource catalog is based on the indicated group of users.

In some examples, the reception component 630 may be configured to support receiving, from the user based on displaying the user interface corresponding to the resource catalog, one or more inputs to the user interface, where receiving the request to access the resource is based on receiving the one or more inputs.

In some examples, the reception component 630 may be configured to support receiving, from the administrator, an indication to modify the name associated with the resource, the icon associated with the resource, the description associated with the resource, or a combination thereof.

In some examples, the access component 635 may be configured to support transmitting, to a resource provider associated with the resource based on granting the user access to the resource, an indication that the user is granted access to the resource.

In some examples, the access component 635 may be configured to support determining to grant the user access to the resource for the duration based on the one or more rules of the access policy. In some examples, the access component 635 may be configured to support transmitting, to the resource provider, an indication of the duration associated with granting the user access to the resource.

In some examples, the reception component 630 may be configured to support receiving, from the user, a second request to access a set of multiple resources associated with the access policy. In some examples, the access component 635 may be configured to support granting the user access to each resource of the set of multiple resources in accordance with the one or more rules of the access policy.

In some examples, the reception component 630 may be configured to support receiving, from the user, a second request to grant a second user of the access request management system access to the resource, where the second user is different from the user. In some examples, the access component 635 may be configured to support granting the second user access to the resource for the duration based on receiving the second request, where granting the second user access to the resource for the duration is in accordance with the one or more rules of the access policy.

Figure 7:
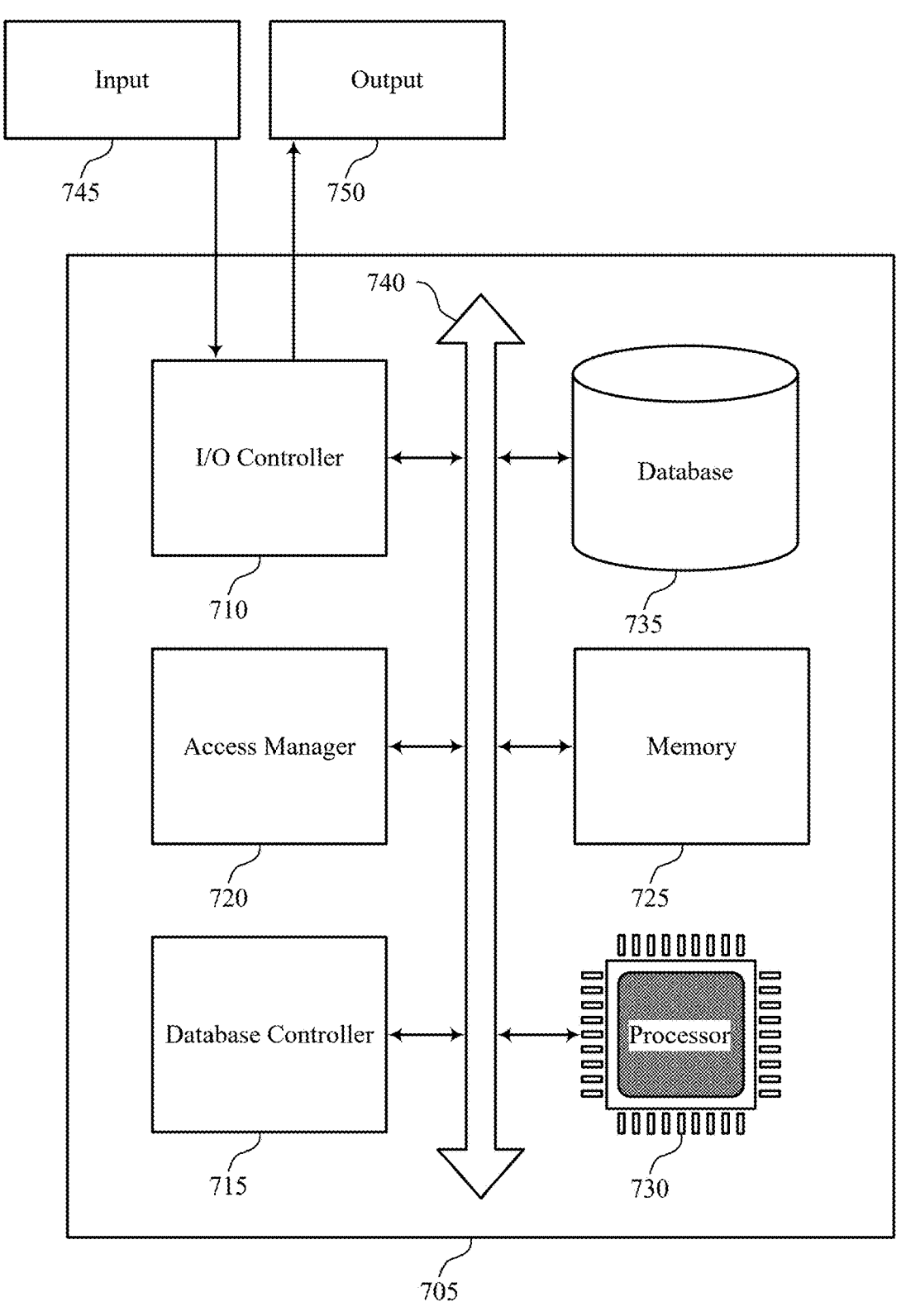
FIG. 7 shows a diagram of a system including a device that supports platform access request management in accordance with aspects of the present disclosure.

FIG. 7 shows a diagram of a system 700 including a device 705 that supports platform access request management in accordance with aspects of the present disclosure. The device 705 may be an example of or include components of a device 505 as described herein. The device 705 may include components for bi-directional voice and data communications including components for transmitting and receiving communications, such as an access manager 720, an I/O controller, such as an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device

705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting platform access request management). The processor 730 may be an example of a single processor or multiple processors. For example, the device 705 may include one or more processors 730.

The access manager 720 may support managing access requests to an access request management system in accordance with examples as disclosed herein. For example, the access manager 720 may be configured to support receiving, from an administrator of the access request management system, a request to create an access policy, the access policy associated with granting users of the access request management system access to one or more resources, where the one or more resources include one or more applications, one or more user groups, one or more entitlement parameters, or a combination thereof. The access manager 720 may be configured to support generating the access policy based on receiving the request, where the access policy includes one or more rules associated with granting the users access to the one or more resources for a duration. The access manager 720 may be configured to support receiving, from the administrator, an indication to add the one or more resources to the access policy. The access manager 720 may be configured to support receiving, from a user of the access request management system, a request to access a resource of the one or more resources. The access manager 720 may be configured to support granting the user access to the resource for the duration based on receiving the request, where granting the user access to the resource for the duration is in accordance with the one or more rules of the access policy.

By including or configuring the access manager 720 in accordance with examples as described herein, the device

705 may support techniques for improved user experience related to reduced processing and reduced overhead, increased system security, and more efficient utilization of computing resources.

FIG. 8 shows a flowchart illustrating a method 800 that supports platform access request management in accordance with aspects of the present disclosure. The operations of the method 800 may be implemented by an access request management system or its components as described herein. For example, the operations of the method 800 may be performed by an access request management system as described with reference to FIGS. 1 through 7. In some examples, an access request management system may execute a set of instructions to control the functional elements of the access request management system to perform the described functions. Additionally, or alternatively, the access request management system may perform aspects of the described functions using special-purpose hardware.

At 805, the method may include receiving, from an administrator of the access request management system, a request to create an access policy, the access policy associated with granting users of the access request management system access to one or more resources, where the one or more resources include one or more applications, one or more user groups, one or more entitlement parameters, or a combination thereof. The operations of 805 may be performed in accordance with examples as disclosed herein. In some examples, aspects of the operations of 805 may be performed by a policy creation component 625 as described with reference to FIG. 6.

At 810, the method may include generating the access policy based on receiving the request, where the access policy includes one or more rules associated with granting the users access to the one or more resources for a duration. The operations of 810 may be performed in accordance with examples as disclosed herein. In some examples, aspects of the operations of 810 may be performed by a policy creation component 625 as described with reference to FIG. 6.

At 815, the method may include receiving, from the administrator, an indication to add the one or more resources to the access policy. The operations of 815 may be performed in accordance with examples as disclosed herein. In some examples, aspects of the operations of 815 may be performed by a reception component 630 as described with reference to FIG. 6.

At 820, the method may include receiving, from a user of the access request management system, a request to access a resource of the one or more resources. The operations of 820 may be performed in accordance with examples as disclosed herein. In some examples, aspects of the operations of 820 may be performed by a reception component 630 as described with reference to FIG. 6.

At 825, the method may include granting the user access to the resource for the duration based on receiving the request, where granting the user access to the resource for the duration is in accordance with the one or more rules of the access policy. The operations of 825 may be performed in accordance with examples as disclosed herein. In some examples, aspects of the operations of 825 may be performed by an access component 635 as described with reference to FIG. 6.

The following provides an overview of aspects of the present disclosure:

Aspect 1: A method for managing access requests to an access request management system, comprising: receiving, from an administrator of the access request management system, a request to create an access policy, the access policy associated with granting users of the access request management system access to one or more resources, wherein the one or more resources comprise one or more applications, one or more user groups, one or more entitlement parameters, or a combination thereof; generating the access policy based at least in part on receiving the request, wherein the access policy comprises one or more rules associated with granting the users access to the one or more resources for a duration; receiving, from the administrator, an indication to add the one or more resources to the access policy; receiving, from a user of the access request management system, a request to access a resource of the one or more resources; and granting the user access to the resource for the duration based at least in part on receiving the request, wherein granting the user access to the resource for the duration is in accordance with the one or more rules of the access policy.

Aspect 2: The method of aspect 1, further comprising: displaying, based at least in part on receiving the request from the user to access the resource, a user interface associated with the access policy based at least in part on an identity of the user, the one or more rules of the access policy, or both.

Aspect 3: The method of aspect 2, further comprising: receiving, based at least in part on displaying the user interface, one or more inputs from the user, wherein granting the user access to the resource is based at least in part on the one or more inputs.

Aspect 4: The method of any of aspects 1 through 3, further comprising: displaying, to one or more users including the user, a user interface corresponding to a resource catalog, the resource catalog comprising a respective indicator for each of the one or more resources, wherein the respective indicator comprises a name associated with the resource, an icon associated with the resource, a description associated with the resource, or a combination thereof.

Aspect 5: The method of aspect 4, wherein the one or more rules of the access policy indicate a group of users capable of requesting access to the one or more resources, and displaying the user interface corresponding to the resource catalog is based at least in part on the indicated group of users.

Aspect 6: The method of any of aspects 4 through 5, further comprising: receiving, from the user based at least in part on displaying the user interface corresponding to the resource catalog, one or more inputs to the user interface, wherein receiving the request to access the resource is based at least in part on receiving the one or more inputs.

Aspect 7: The method of any of aspects 4 through 6, further comprising: receiving, from the administrator, an indication to modify the name associated with the resource, the icon associated with the resource, the description associated with the resource, or a combination thereof.

Aspect 8: The method of any of aspects 1 through 7, further comprising: transmitting, to a resource provider associated with the resource based at least in part on granting the user access to the resource, an indication that the user is granted access to the resource.

Aspect 9: The method of aspect 8, further comprising: determining to grant the user access to the resource for the duration based at least in part on the one or more rules of the access policy; and transmitting, to the resource provider, an indication of the duration associated with granting the user access to the resource.

Aspect 10: The method of any of aspects 1 through 9, further comprising: receiving, from the user, a second request to access a plurality of resources associated with the access policy; and granting the user access to each resource of the plurality of resources in accordance with the one or more rules of the access policy.

Aspect 11: The method of any of aspects 1 through 10, further comprising: receiving, from the user, a second request to grant a second user of the access request management system access to the resource, wherein the second user is different from the user; and granting the second user access to the resource for the duration based at least in part on receiving the second request, wherein granting the second user access to the resource for the duration is in accordance with the one or more rules of the access policy.

Aspect 12: An apparatus for managing access requests to an access request management system, comprising one or more memories storing processor-executable code, and one or more processors coupled with the one or more memories and individually or collectively operable to execute the code to cause the apparatus to perform a method of any of aspects 1 through 11.

Aspect 13: An apparatus for managing access requests to an access request management system, comprising at least one means for performing a method of any of aspects 1 through 11.

Aspect 14: A non-transitory computer-readable medium storing code for managing access requests to an access request management system, the code comprising instructions executable by one or more processors to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing access requests to an access request management system, comprising:

receiving, from an administrator of the access request management system, a request to create an access policy, the access policy associated with granting users of the access request management system access to one or more resources, wherein the one or more resources comprise one or more applications, one or more user groups, one or more entitlement parameters, or a combination thereof;

generating the access policy based at least in part on receiving the request, wherein the access policy comprises one or more rules associated with granting the users access to the one or more resources for a duration;

receiving, from the administrator, an indication to add the one or more resources to the access policy;

receiving, from a user of the access request management system, a request to access a resource of the one or more resources;

granting the user access to the resource for the duration based at least in part on receiving the request, wherein granting the user access to the resource for the duration is in accordance with the one or more rules of the access policy;

receiving, from the user, a second request to grant a second user of the access request management system access to the resource, wherein the second user is different from the user; and granting the second user access to the resource for the duration based at least in part on receiving the second request, wherein granting the second user access to the resource for the duration is in accordance with the one or more rules of the access policy.

2. The method of claim 1, further comprising:

displaying, based at least in part on receiving the request from the user to access the resource, a user interface associated with the access policy based at least in part on an identity of the user, the one or more rules of the access policy, or both.

3. The method of claim 2, further comprising:

receiving, based at least in part on displaying the user interface, one or more inputs from the user, wherein granting the user access to the resource is based at least in part on the one or more inputs.

4. The method of claim 1, further comprising:

displaying, to one or more users including the user, a user interface corresponding to a resource catalog, the resource catalog comprising a respective indicator for each of the one or more resources, wherein the respective indicator comprises a name associated with the resource, an icon associated with the resource, a description associated with the resource, or a combination thereof.

5. The method of claim 4, wherein the one or more rules of the access policy indicate a group of users capable of requesting access to the one or more resources, and wherein displaying the user interface corresponding to the resource catalog is based at least in part on the indicated group of users.

6. The method of claim 4, further comprising:

receiving, from the user based at least in part on displaying the user interface corresponding to the resource catalog, one or more inputs to the user interface, wherein receiving the request to access the resource is based at least in part on receiving the one or more inputs.

7. The method of claim 4, further comprising:

receiving, from the administrator, an indication to modify the name associated with the resource, the icon associated with the resource, the description associated with the resource, or a combination thereof.

8. The method of claim 1, further comprising:

transmitting, to a resource provider associated with the resource based at least in part on granting the user access to the resource, an indication that the user is granted access to the resource.

9. The method of claim 8, further comprising:

determining to grant the user access to the resource for the duration based at least in part on the one or more rules of the access policy; and transmitting, to the resource provider, an indication of the duration associated with granting the user access to the resource.

10. The method of claim 1, further comprising:

receiving, from the user, a second request to access a plurality of resources associated with the access policy; and granting the user access to each resource of the plurality of resources in accordance with the one or more rules of the access policy.

11. An apparatus for managing access requests to an access request management system, comprising:

one or more memories storing processor-executable code; and one or more processors coupled with the one or more memories and individually or collectively operable to execute the code to cause the apparatus to:

receive, from an administrator of the access request management system, a request to create an access policy, the access policy associated with granting users of the access request management system access to one or more resources, wherein the one or more resources comprise one or more applications, one or more user groups, one or more entitlement parameters, or a combination thereof;

generate the access policy based at least in part on receiving the request, wherein the access policy comprises one or more rules associated with granting the users access to the one or more resources for a duration;

receive, from the administrator, an indication to add the one or more resources to the access policy;

receive, from a user of the access request management system, a request to access a resource of the one or more resources;

grant the user access to the resource for the duration based at least in part on receiving the request, wherein granting the user access to the resource for the duration is in accordance with the one or more rules of the access policy;

receive, from the user, a second request to grant a second user of the access request management system access to the resource, wherein the second user is different from the user; and grant the second user access to the resource for the duration based at least in part on receiving the second request, wherein granting the second user access to the resource for the duration is in accordance with the one or more rules of the access policy.

12. The apparatus of claim 11, wherein the one or more processors are individually or collectively further operable to execute the code to cause the apparatus to:

display, based at least in part on receiving the request from the user to access the resource, a user interface associated with the access policy based at least in part on an identity of the user, the one or more rules of the access policy, or both.

13. The apparatus of claim 12, wherein the one or more processors are individually or collectively further operable to execute the code to cause the apparatus to:

receive, based at least in part on displaying the user interface, one or more inputs from the user, wherein granting the user access to the resource is based at least in part on the one or more inputs.

14. The apparatus of claim 11, wherein the one or more processors are individually or collectively further operable to execute the code to cause the apparatus to:

display, to one or more users including the user, a user interface corresponding to a resource catalog, the resource catalog comprising a respective indicator for each of the one or more resources, wherein the respective indicator comprises a name associated with the resource, an icon associated with the resource, a description associated with the resource, or a combination thereof.

15. The apparatus of claim 14, wherein:

the one or more rules of the access policy indicate a group of users capable of requesting access to the one or more resources, and displaying the user interface corresponding to the resource catalog is based at least in part on the indicated group of users.

16. The apparatus of claim 14, wherein the one or more processors are individually or collectively further operable to execute the code to cause the apparatus to:

receive, from the user based at least in part on displaying the user interface corresponding to the resource catalog, one or more inputs to the user interface, wherein receiving the request to access the resource is based at least in part on receiving the one or more inputs.

17. The apparatus of claim 14, wherein the one or more processors are individually or collectively further operable to execute the code to cause the apparatus to:

receive, from the administrator, an indication to modify the name associated with the resource, the icon associated with the resource, the description associated with the resource, or a combination thereof.

18. The apparatus of claim 11, wherein the one or more processors are individually or collectively further operable to execute the code to cause the apparatus to:

transmit, to a resource provider associated with the resource based at least in part on granting the user access to the resource, an indication that the user is granted access to the resource.

19. A non-transitory computer-readable medium storing code for managing access requests to an access request management system, the code comprising instructions executable by one or more processors to:

receive, from an administrator of the access request management system, a request to create an access policy, the access policy associated with granting users of the access request management system access to one or more resources, wherein the one or more resources comprise one or more applications, one or more user groups, one or more entitlement parameters, or a combination thereof;

generate the access policy based at least in part on receiving the request, wherein the access policy comprises one or more rules associated with granting the users access to the one or more resources for a duration;

receive, from the administrator, an indication to add the one or more resources to the access policy;

receive, from a user of the access request management system, a request to access a resource of the one or more resources;

grant the user access to the resource for the duration based at least in part on receiving the request, wherein granting the user access to the resource for the duration is in accordance with the one or more rules of the access policy;

receive, from the user, a second request to grant a second user of the access request management system access to the resource, wherein the second user is different from the user; and grant the second user access to the resource for the duration based at least in part on receiving the second request, wherein granting the second user access to the resource for the duration is in accordance with the one or more rules of the access policy.

* * * * *